(12) United States Patent
Wilkie et al.

(10) Patent No.: US 7,696,271 B2
(45) Date of Patent: Apr. 13, 2010

(54) HIGH BARRIER COMPOSITIONS AND ARTICLES EMPLOYING SAME

(75) Inventors: Andrew F. Wilkie, Avondale, PA (US); David Midgette, New Castle, DE (US)

(73) Assignee: Applied Extrusion Technologies, Inc., New Castle, DE (US)

( * ) Notice: Subject to any disclaimer, the term of this patent is extended or adjusted under 35 U.S.C. 154(b) by 43 days.

(21) Appl. No.: 12/059,378

(22) Filed: Mar. 31, 2008

(65) Prior Publication Data

US 2008/0248319 A1    Oct. 9, 2008

Related U.S. Application Data

(60) Provisional application No. 60/909,176, filed on Mar. 30, 2007, provisional application No. 60/910,084, filed on Apr. 4, 2007.

(51) Int. Cl.
*A61K 8/73* (2006.01)
*C08K 5/04* (2006.01)
*C08G 67/02* (2006.01)
*B32B 27/40* (2006.01)

(52) U.S. Cl. .................. 524/394; 524/27; 524/612; 428/424.2; 428/910

(58) Field of Classification Search .............. 428/424.4, 428/425.8, 424.2, 910; 523/111; 524/612, 524/394, 27
See application file for complete search history.

(56) References Cited

U.S. PATENT DOCUMENTS

| | | | |
|---|---|---|---|
| 4,647,648 A | 3/1987 | Silvis et al. | |
| 4,881,649 A * | 11/1989 | Hsu et al. | 383/200 |
| 5,008,137 A | 4/1991 | Nugent, Jr. et al. | |
| 5,275,853 A | 1/1994 | Silvis et al. | |
| 5,489,455 A | 2/1996 | Nugent, Jr. et al. | |
| 5,529,834 A * | 6/1996 | Tsai et al. | 428/215 |
| 5,573,819 A | 11/1996 | Nugent, Jr. et al. | |
| 5,834,078 A | 11/1998 | Cavitt et al. | |
| 6,117,538 A * | 9/2000 | Hirata et al. | 428/315.9 |
| 6,180,715 B1 * | 1/2001 | Schmidt | 524/611 |
| 6,498,201 B1 * | 12/2002 | Corzani et al. | 523/111 |
| 6,589,621 B1 | 7/2003 | Beckerdite et al. | |
| 6,800,573 B2 * | 10/2004 | Van De Ven et al. | 442/377 |
| 6,982,119 B2 | 1/2006 | Shi et al. | |
| 7,163,727 B2 | 1/2007 | Su et al. | |
| 2005/0186414 A1 | 8/2005 | Su et al. | |
| 2006/0163534 A1 * | 7/2006 | Sugimoto et al. | 252/188.28 |
| 2006/0233988 A1 | 10/2006 | Su et al. | |

FOREIGN PATENT DOCUMENTS

WO    03/089502 A1    10/2003
WO    2006/112836 A1    10/2006

OTHER PUBLICATIONS

Hong et al., Oxygen Barrier Properties of Whey Protein Isolate Coatings on Polypropylene Films, Journal of Food Science/Food Engineering and Physical Properties, vol. 68/1, 224-228 (2003).

McHugh et al., Sorbitol- vs Glycerol-Plasticized Whey Protein Edible Films: Integrated Oxygen Permeability and Tensile Property Evaluation, Journal of Agricultural and Food Chemistry, vol. 42/4, 842-845 (Apr. 1994).

* cited by examiner

*Primary Examiner*—Kevin R. Kruer
(74) *Attorney, Agent, or Firm*—Caesar, Rivise, Bernstein, Cohen & Pokotilow, Ltd.

(57) ABSTRACT

A high barrier composition to a gas or organic liquid usable as a coating or layer on an article. The composition includes a blend of polyetheramine resin and at least one additive being a highly hydrolyzed organic compound, preferably of a low molecular weight, either with our without boric acid. Articles employing the gas barrier composition also constitute a part of this invention.

41 Claims, No Drawings

HIGH BARRIER COMPOSITIONS AND ARTICLES EMPLOYING SAME

RELATED APPLICATIONS

This application claims priority from provisional application Ser. Nos. 60/909,176, filed on Mar. 30, 2007 and 60/910,084, filed on Apr. 4, 2007, both titled High Oxygen Barrier Compositions. These provisional applications are fully incorporated by reference herein.

FIELD OF INVENTION

This invention relates generally to high barrier compositions employed as a resinous layer on articles and to articles employing such high barrier compositions. Most preferably such compositions provide a high barrier to gases, such as oxygen, nitrogen, carbon dioxide and blends thereof and also may provide desired barrier properties for organic liquids, such hydrocarbon based solvents. These high barrier compositions can be utilized in a wide variety of articles such as packaging articles and plastic films. Most preferably the articles or plastic films are employed to package food products. However, the barrier compositions of this invention can be employed as coatings in a variety of different articles in which barrier properties are desired or required, such as in the coating of beverage bottles for retaining carbonation, the coating of rubber articles such as vehicular tires to prevent the loss of air, the packaging of pharmaceuticals to prevent the ingress of air, in balloons to prevent the loss of air, in packaging for retaining flavors and aromas of the packaged products, and in products requiring solvent resistance, such as labels employed in environments in which a barrier to hydrocarbon based solvents, etc. is desired.

BACKGROUND OF THE INVENTION

It has been disclosed in the prior art that polyetheramine resin (PHAE) is a reasonably effective oxygen barrier composition for use in articles such as plastic film structures to improve the oxygen barrier properties of such articles. Representative disclosures relating to polyetheramine resin coatings are included in U.S. Pat. No. 4,647,648 (Silvis et al.); U.S. Pat. No. 5,275,853 ((Silvis et al.); U.S. Pat. No. 5,834,078 (Cavit et al.); U.S. Pat. No. 6,589,621 (Beckerdite et al.); U.S. Pat. No. 7,163,727 (Su et al.); U.S. Pat. No. 5,008,137 (Nugent et al.); U.S. Pat. No. 5,489,455 (Nugent et al.); U.S. Pat. No. 5,573,819 (Nugent et al.) and U.S. Pat. No. 6,982,199 (Shi et al.). Representative United States published patent applications are 20060233988 and 20050186414; both to Su et al.

Although a polyetheramine resin layer does provide enhanced oxygen barrier properties in film structures a need continually exists for achieving even higher barrier properties; most preferably to gases, but also to organic liquids. It is highly desirable that such higher barrier properties are achieved without any significant adverse effect on other desired properties of the film, such as, water vapor transmission rate and haze, or lack of clarity.

This invention relates to compositions having enhanced barrier properties, as compared to the barrier properties of polyetheramine resin (PHAE) alone, and to articles employing such compositions; preferably articles employed in packaging applications, such as plastic films and containers, e.g., PET bottles and most preferably articles employed in the packaging of food products including carbonated liquids and potentially other liquids. However, the compositions of this invention are believed to be usable as coatings in a wide variety of other products in which barrier properties to gases or organic liquids are desired or required, such as in vehicle tires to aid in preventing the leakage of air there from.

All references cited herein are incorporated herein by reference in their entireties.

BRIEF SUMMARY OF THE INVENTION

High barrier compositions in accordance with this invention include a blend of polyetheramine resin and certain additives that are highly hyroxylated organic compounds (including polymers). In certain preferred embodiments boric acid also is included.

Unless otherwise specifically limited herein, reference throughout this application, including the claims, to a "highly hydroxylated organic compound" means hydroxylated organic compounds including a hydroxyl-to-carbon ratio of 0.5 or greater; more preferably greater than 0.6 and even more preferably in the range of 0.6-1. Most preferably the highly hydroxylated organic compounds are of a low molecular weight; however, in accordance with the broadest aspects of this invention the highly hydroxylated organic compounds may be polymers that do not have a low molecular weight such as crystallized polyvinyl alcohol. Unless otherwise specifically limited reference throughout this application, including the claims, to "low molecular weight" means a molecular weight less than 2,000; more preferably less than 1,000; even more preferably less than 500 and even more preferably less than 200.

Although this invention relates generally to compositions or coatings providing high barrier properties to gases and organic liquids, this invention will be described in connection with compositions employing high oxygen barrier properties.

Most preferably the oxygen barrier compositions of this invention are a blend of polyetheramine resin and one or more highly hyroxylated organic compounds, with or without boric acid, most preferably having a low molecular weight, and being employed as a coating or layer on articles at a weight percent of said composition for enhancing the oxygen barrier properties of the polyetheramine resin by at least twenty percent (20%) at approximately the same coating weight of the polyetheramine resin alone on said articles.

In preferred embodiments of this invention the material blended with the polyetheramine resin in the high oxygen barrier composition is either glycerin (MW 92.09) or sorbitol (MW 178.14) or blends of glycerin and sorbitol. The most preferred highly hydroxylated material added to the polyetheramine is sorbitol.

It should be noted that sorbitol, and if desired boric acid (in their anhydrous forms) could potentially be added directly (in situ) in the reaction extrusion process in which the PHAE is formed. In this latter case the PHAE already will include the preferred additives in accordance with this invention.

Sorbitol [C6] is one of several, linear, saturated [OH/C=1] hydroxylated molecules in the class referred to as "sugar alcohols." Other sugar alcohols potentially usable in this invention include erythritol [C4], xylitol [C-5], L-arabitol [C-5], D-mannitol [C6, sorbitol isomer]. Substantially hydroxylated sugar alcohols [OH/C>0.7], maltitol [C-10] and D-lactitol-hydrate [C11] contain ring structures and are significantly more complex (bulky) than the linear sugar alcohols, which are preferred. It has been determined that C4-C6 sugar alcohols and their isomers yield essentially equivalent improvements in oxygen barrier when added to the PHAE where as the larger C10 and higher molecules provided less improvement. However, these latter sugar alcohols are considered to be within the broadest scope of this invention.

Sorbitol is considered to be the most preferred additive of the group because of its high boiling point, low cost, and commercial availability.

Applicants also have discovered that sucrose (table sugar) and fructose (corn syrup) provide gas barrier improvement to PHAE.

In preferred embodiments of this invention the material blended with the polyetheramine resin is present in a weight percent in the range of 0.5 to at least 40% based on the weight of the composition. The preferred range for glycerin is over 5% to less than 30% and the preferred range for sorbitol is over 5% to at least 40%.

With respect to glycerin the upper limit is dictated by the exudation of glycerin from the composition, resulting in the existence of an undesired oily condition. In accordance with the broadest aspects of the invention employing glycerin, the upper weight limit of glycerin in the composition is dictated by the above-discussed exudation of the glycerin from the composition.

Since both glycerin and sorbitol are significantly less costly than polyetheramine, it is beneficial to be able to utilize the highest possible quantity of glycerin or sorbitol in the blend, while providing a corresponding reduction in the quantity, or weight, of polyetheramine.

Also, when compositions of this invention employing highly hydroxylated compounds could possibly be exposed to high humidity conditions, in order to prevent a deterioration in clarity of the composition, i.e., an increase in haze, boric acid is added to the blend; preferably in a quantity between about 0.5% and less than 3% by weight, based on the total weight of the composition. Applicants also have discovered that the addition of boric acid to sorbitol actually stabilizes the sorbitol; making sorbitol a desired additive even in products wherein haze is not an issue.

Articles including high barrier properties (preferably to gas or organic liquids) also constitute a part of this invention and include, but are not limited to, articles having a high oxygen barrier coating or layer comprising a blend of polyetheramine resin and one or more highly hydroxylated organic compounds, and also preferably boric acid when haze is a concern or when boric acid stabilizes the particular highly hydroxylated organic compound being employed. Most preferably the additives employed enhance the oxygen barrier properties of the polyetheramine resin by at least twenty percent (20%).

In a most preferred embodiment of this invention, a high oxygen barrier layer is applied as an aqueous coating to a coextruded article, such as a container or flexible plastic substrate such as flexible plastic film employed in packaging applications.

Most preferably, the coextruded plastic article is a bi-axially oriented plastic film, and the high oxygen barrier layer is applied as a coating to the co-extruded substrate either after bi-axially orienting the substrate or between the machine direction and cross-machine direction orientation steps in forming the plastic substrate (or to a cast tube prior to biaxial orientation or to a cast sheet prior to simultaneous biaxial orientation such as in a linear speed induction motor (LSIM)). This coating layer can also be applied to non-oriented (cast) and mono-axially oriented films and sheets.

When the coating is employed in-line, prior to being oriented in a transverse dimension in a heated oven, it is important that the boiling point of the highly hydroxylated organic compound be sufficiently high so as not to vaporize out during the residence time of the film in the orienting oven (e.g., the tenter section of a film forming line). Pure glycerin has a boiling point of approximately 182° C., while commercial grade glycerin generally has impurities that tend to lower the boiling point to approximately 171° C. The commercial grade glycerin may vaporize out of the product in some production operations when exposed to temperatures in excess of 171° C. for a sufficient length of time to cause such vaporization to occur.

In the most preferred embodiments of the invention, the coextruded substrate includes a polyolefin core; preferably polypropylene and a tie layer to promote adhesion of the polar high oxygen barrier coating to the non-polar plastic substrate.

In a preferred embodiment of this invention, the tie layer is maleic-anhydride grafted polyolefin; preferably polypropylene and most preferably a polypropylene homopolymer or an ethylene-propylene copolymer wherein the ethylene content is less than ten percent (10) by weight of the co-polymer.

The above and other objects of this invention will be better understood by referring to the description of the best mode of the invention, which follows.

BEST MODE OF THE INVENTION

The present invention is directed to high gas barrier compositions employing polyetheramine resin and having enhanced gas barrier properties as compared to the polyetheramine resin alone. This invention will be described in detail with respect to enhanced oxygen barrier properties provided by the barrier compositions.

In particular, Applicants have discovered, quite surprisingly, that glycerin, and sorbitol (most preferably sorbitol) can be blended with polyetheramine resin either individually or in combination, with or without boric acid, to form a high oxygen barrier composition that substantially exceeds the oxygen barrier properties of the polyetheramine resin alone. In addition, as noted earlier, applicants have discovered that the addition of boric acid to sorbitol actually stabilizes the sorbitol.

Most preferably the compositions of this invention improve the oxygen barrier properties of polyetheramine resin alone by at least twenty percent (20%) when included as a coating on a plastic film at the same thickness level as polyetheramine resin by itself. Although the preferred embodiment employs sorbitol as the additive to polyetheramine to enhance the oxygen barrier properties, in accordance with the broadest aspects of this invention other highly hydroxylated organic compounds can be added to the polyetheramine, provided these additives function to reduce the oxygen barrier properties of the barrier composition.

Representative polyetheramine resins utilizable in this invention are commercially available from ICI Paints North America, 16651 Sprague Road, Strongsville, Ohio 44136, and are water-based coating materials designated, OxyBloc® 670 C 1376 and OxyBloc® 1370. Representative polyetheramine resin formulations are disclosed in U.S. Pat. Nos. 5,275,853 and 5,834,078. In accordance with the broadest aspects of this invention polyetheramine resins other than the above identified OxyBloc® resins are believed to be usable in this invention. In fact, the structural formula for OxyBloc® can constitute many variations, as disclosed in U.S. Pat. No. 6,589,621, titled "Thermally Stable Polyetheramines" and identifying Beckerdite et al., as the inventors. OxyBloc® 670 C 1376 is the polyetheramine resin that is most preferred in the present invention.

OxyBloc® 670 C 1376, is supplied in an approximately 25%-35% solids water based system and is characterized in its dry anhydrous form as being completely amorphous. This coating material or composition can be applied to the surface of a polymeric article, such as a plastic film, by any of the known methods, including direct gravure coating. This coating can be applied out of line to a base film substrate after the base film has been coextruded and bi-axially oriented, or it can be applied in-line during the manufacture of the base film, wherein the coating is applied to the substrate after machine direction orientation, but prior to transverse direction orientation (also cast sheet/tube coating then biaxial orientation via LSIM or blown (tubular) film processes). In the latter techniques, the coating is dried to remove the water prior to completion of the transverse and or MD/TD (blown/LSIM) direction orientation step.

Although this invention will be described hereinafter in connection with the use of the compositions of this invention on plastic films, in accordance with the broadest aspects of this invention the coatings of this invention are usable on any articles wherein improved barrier properties are desired (preferably to gases and organic liquids), including rigid articles such as plastic containers. Most preferably the articles on which the compositions of this invention are desirably employed are articles intended to be used to package food and liquid products.

As stated earlier, applicants have determined that the blends of the present invention, which include polyetheramine resin blended with one or more highly hydroxylated organic compounds; most preferably low molecular weight compounds, e.g., glycerin and/or sorbitol, both with or without boric acid will enhance gas barrier properties of the film, as compared to utilizing a polyetheramine resin coating by itself.

Applicants have determined that the highly hydroxylated organic compounds usable in this invention need to be soluble with the polyetheramine resin. In addition, the ingredients described previously to be added to the polyetheramine resin should not adversely interact with the polyetheramine resin to cause the aqueous coating mixture to excessively thicken, gel, or become paste-like within a reasonable period of time prior to application (generally referred to as pot life) and therefore render the composition unusable in this invention.

As will be explained hereafter, applicants quite surprisingly discovered that the addition of glycerin to polyetheramine resin enhanced the oxygen barrier properties of the coated film, as compared to a similar film wherein the coating included only polyetheramine resin. that is, where the polyetheramine resin was not blended with glycerin. Based upon this discovery, applicants have experimented with a variety of different materials as possible additives to polyetheramine resin, and to date, have discovered that sorbitol, both alone or in combination with glycerin, very effectively enhance the oxygen barrier properties of the polyetheramine resin, and actually is preferred over glycerin. Applicants also determined that the additive to the polyetheramine resin could be a blend of glycerin and sorbitol, as compared to the use of each separately, as will be discussed in greater detail hereinafter.

Applicants further believe that a person skilled in the art and provided with the disclosed invention herein will be able to determine those highly hydroxylated organic compounds, in addition to glycerin and sorbitol, which will enhance the oxygen barrier properties of the polyetheramine resins.

As will be explained in detail hereinafter, applicants also have discovered that the addition of boric acid to a number of the above-mentioned ingredients substantially improves the dried coating's resistance to high relative humidity (moisture) environments. In addition, boric acid has been found to stabilize the sorbitol and therefore may stabilize other usable, highly hydroxylated organic compounds.

This invention first will be specifically disclosed in connection with the addition of glycerin in specified amounts to the polyetheramine resin to achieve enhanced oxygen barrier properties in accordance with this invention. Thereafter, the invention will be discussed in connection with the addition of blends of glycerin and sorbitol, sorbitol alone and sorbitol/boric acid.

The initial motivation for modifying the OxyBloc® coating with glycerin came from a desire to exfoliate and compatabilize a nano-clay into the OxyBloc® 670 C 1376 for improved barrier performance (that is, to break apart or separate the stacked plates of the nano-clay particles to make the nano-clay compatible with the polyetheramine resin). Applicant believed that the addition of a properly exfoliated nano-clay would potentially enhance or improve the oxygen barrier performance of the film. Applicants only intended to employ the glycerin as a dispersant for the nano-clay, not expecting that the glycerin itself would provide any enhanced oxygen barrier properties. Specifically, glycerin is a syrupy liquid that, in accordance with Applicants initial thinking, appeared to provide a high viscosity medium for the nano-clay particles to exfoliate with high shear mixing. Compatibility of the glycerin with the OxyBloc® was anticipated because each component possessed hydroxyl functionality.

In accordance with the initial testing a nano-clay supplied by Sud-Chemie, Nanofil®2 was premixed at a ratio of approximately 1:7 parts by weight clay-to-glycerin and stirred with a high shear mixing blade at a speed of approximately 2200 rpm. Deionized water was then added in order to reduce the viscosity of the paste-like mixture so that it could be added to the water-based polyetheramine resin. The resulting coating was then applied to a flame treated bi-axially oriented polypropylene substrate of approximately 115 gauge with a #10 Mayer rod, and then subsequently hot air dried at 115° C. for ~2 minutes. The dried coating had a composition of approximately 80 parts OxyBloc® (i.e., polyetheramine resin)/17.5 parts glycerin/2.5 parts nano-clay. As a control Applicants formulated a coating of 80% polyetheramine resin and 20% glycerin, and as a second control employed a coating 100% polyetheramine resin. The test results are shown in Table 1, below.

TABLE 1

| Coating Composition | Coating Weight (lbs/ream) | % Haze | WVTR (g/100 in²/day 100° F., 90% RH) | O2TR (cc/100 in²/day 73° F., 0% RH) |
|---|---|---|---|---|
| OxyBloc ® 670 C 1376 | 2.94 | 3.1 | 0.22 | 0.24 |
| Oxy/glycerin/Nanofil2 | 2.45 | 11.7 | 0.27 | 0.12 |
| OxyBloc/glycerin | 2.85 | 3.3 | 0.25 | 0.09 |

Quite surprisingly, and as can be seen in Table 1, the results of the testing showed that for similar coating weights the oxygen barrier properties of the OxyBloc® 670 C 1376 coating was significantly improved by the incorporation of glycerin therein. Moreover, the addition of the nano-clay did not improve the oxygen barrier properties and actually caused a substantial increase in the haze of the film (because the nano-clay was not exfoliated and created micro-voiding). However, it is believed that nano-clay, and possibly other nano-particles, if properly exfoliated, may function to enhance the barrier properties of the film without creating an excessive haze problem.

Thus, Applicants discovered that the material intended to function as a carrier for the nano-clay, i.e., the glycerin, actually provided the improved oxygen barrier properties, while the nano-clay itself did not provide any material benefit. In fact, the coating including OxyBloc®, glycerin and nano-clay had a slightly higher oxygen transmission rate than the blend of OxyBloc® and glycerin, by itself. Specifically, the combination of OxyBloc®, glycerin and Nanofil®2 had a oxygen transmission rate of 0.12 cc\100 in$^2$\day when the coating weight was 2.45 lbs. per ream, whereas the Oxy-Bloc® and glycerin blend had an oxygen transmission rate of 0.09 cc\100 in$^2$ \day with a coating weight of 2.85 lbs. per ream. It is possible that the slightly better oxygen transmission barrier properties of the OxyBlock/glycerin blend by itself are attributable to the fact that the coating weight was slightly higher than the coating weight of the OxyBloc®/glycerin/Nanofil®2 coating. However, it definitely appears that the addition of the Nanofil®2 to the blend does not enhance the oxygen transmission barrier properties, and in fact, materially adversely affects the clarity of the product.

In distinction, the OxyBloc® by itself, at a coating weight of 2.94 lbs. per ream (the highest coating weight of the three samples) had an oxygen transmission level at 0.24 cc\100 in$^2$ \day; substantially higher then the oxygen transmission level employing glycerin in the blend.

Thus, the combination of the OxyBloc and glycerin showed a significant improvement of approximately 63% in the oxygen transmission barrier properties, as compared to the OxyBloc, by itself. The percentage improvement in barrier properties referred to throughout this application is calculated by the following formula:

Percent improvement=100−((oxygen transmission rate of Blend/oxygen transmission rate of polyetheramine resin by itself)×100).

It should be noted that in this initial testing the 20 weight percent of glycerin in the blend of OxyBloc and glycerin did not show any evidence of exudation from the OxyBloc® itself.

In summary, the blend of OxyBloc® and glycerin significantly improved the oxygen barrier properties of the film as compared to use of the OxyBloc® by itself. Moreover, the addition of the nano-clay did not improve the oxygen barrier properties and actually caused a substantial increase in the haze of the product. However, as noted earlier, a properly exfoliated nano-clay (or nano-particle) could potentially further enhance the oxygen barrier properties of the film without creating excessive haze.

In a subsequent test, glycerin was incorporated into the polyetheramine resin at 10%, 20% and 30%. A control did not include any glycerin in the OxyBloc. These formulations were applied to a 115 gauge multilayer base film with #2.5, 6, 9 and 18 Mayer Rods to yield progressively heavier coating weights for each of the blends. The results of this testing are set forth in Table 2 below.

TABLE 2

| Coating Composition | Mayer Rod # | O2TR (cc/100 in$^2$/day 73° F., 0% RH) | Comments |
|---|---|---|---|
| 100% OxyBloc ® | 2.5 | 1.27 | |
| | 6 | 0.41 | |
| | 9 | 0.28 | |
| | 18 | 0.19 | |
| 90% Oxy/10% glycerin | 2.5 | 1.24 | |
| | 6 | 0.36 | |
| | 9 | 0.04 | |
| | 18 | 0.11 | |
| 80% Oxy/20% glycerin | 2.5 | 2.9 | coating surface oily and sticky |
| | 6 | 1.7 | coating surface oily and sticky |
| | 9 | 1.0 | coating surface oily and sticky |
| | 18 | 1.0 | coating surface oily and sticky |
| 70% Oxy/30% glycerin | 2.5 | 6.9 | coating surface oily and sticky |
| | 6 | 2.9 | coating surface oily and sticky |
| | 9 | 2.2 | coating surface oily and sticky |
| | 18 | 1.3 | coating surface oily and sticky |

Although the specific coating weights applied by the various Mayer Rods were not documented, the results reported in Table 2 show that an improvement in oxygen barrier properties was achieved by adding glycerin to the OxyBloc® 670 C 1376 at 10 weight percent, with the most dramatic results being achieved in the product wherein the oxygen barrier coatings were applied with #9 and #18 Mayer Rods (i.e. thicker coating layers).

It also should be noted that blends employing 20% and 30% glycerin in them provided a coating surface which was oily and sticky, and therefore considered to be unacceptable However, in subsequent testing the oily and sticky coated surface did not occur at 20% addition, only at 30% addition. Although applicants do not have a definitive explanation why the coating was oily and sticky with 20% addition in the testing reported in Table 2, it is possible that the actual quantity of the glycerin added to the polyetheramine was in excess of 20%, by weight.

Based upon the excellent results achieved with the addition of 10% glycerin to the polyetheramine resin, Applicants investigated the affect of adding glycerin to the polyetheramine resin at percentages between 0 and 10 weight percent. Specifically, glycerin was added to the OxyBloc® 670 C 376 at 0, 2, 5 and 10 weight percent, and then coated onto a 115 gauge bi-axially oriented base film with a #10 Mayer Rod. Thus, the coating weight applied to the base film was intended to be substantially the same for all samples. The test results are set forth in Table 3, below.

TABLE 3

| Coating Composition | Coating Weight lbs/ream | % Haze | WVTR (g/100 in²/day) 100° F., 90% RH | O2TR (cc/100 in²/day) 73° F., 0% RH |
| --- | --- | --- | --- | --- |
| 100% OxyBloc ® | 2.8 | 3.1 | 0.24 | 0.27 |
| 98% Oxy/2% glycerin | 2.7 | 3.1 | 0.24 | 0.24 |
| 95% Oxy/5% glycerin | 2.3 | 3.1 | 0.28 | 0.24 |
| 90% Oxy/10% glycerin | 3.2 | 3.2 | 0.28 | 0.135 |

The results reported in Table 3 confirm that the improvement in oxygen barrier properties is significantly improved at approximately 10 weight percent addition of glycerin, as compared to the addition of 5 weight percent addition. The haze of the OxyBloc® coating was unaffected up to about 10% glycerin. However, there was a slight increase in the water vapor transmission rate with the addition of both 5% glycerin and 10% glycerin to the polyetheramine resin.

In addition, the coating adhesion, tested with 3M Scotch #610 and #800 tapes was excellent with no coating lift or pick off occurring with up to 10 weight percent glycerin. Moreover, there also was no indication of the glycerin exuding to the surface of the film; an undesired phenomenon that was observed in the prior testing with 20% glycerin and 30% glycerin added to the polyetheramine resin.

Films with the same coating compositions identified in Table 3 were then bell jar metallized and the metallized films were re-evaluated for barrier and adhesion properties. The results of this later evaluation are set forth in Table 4.

TABLE 4

| Coating Composition | Optical Density | WVTR (g/100 in²/day) 100° F., 90% RH | O2TR (cc/100 in²/day 73° F., 0%% H) |
| --- | --- | --- | --- |
| 100% OxyBloc ® | 1.2 | 0.18 | 1.6 |
| 98% Oxy/2% glycerin | 3.9 | 0.15 | 0.0064 |
| 95% Oxy/5% glycerin | 4.0 | 0.28 | 0.0035 |
| 90% Oxy/10% glycerin | 3.3 | 0.22 | 0.0031 |

It should be noted that the bell jar metallization technique is used to screen hand sheet samples and is not an optimum method for providing a uniform metal coating or layer on the films (it is employed as a first approximation of production metallization). The metallized films were discolored, which evidences a sign of poor (insufficient) vacuum pressure during metallization. Moreover, the metallized samples contained many medium to large numbers of pinholes, which essentially are defects in the metal layer. In addition, the "control" (the sample including 100% OxyBloc) was only metallized to an optical density of 1.2, which, compared to the optical density of the other samples, definitely lowered the oxygen barrier performance for that particular film. This was to be expected because barrier properties are a function of metal thickness or deposition).

It should be understood that the metallization process can be carried out with pure metals, such as aluminum or with oxides, such as aluminum oxide and silicone oxide. The specific compositions employed in the metallization process do not constitute a limitation on the broadest aspects of this invention.

Nonetheless, in spite of the defects in connection with the bell jar metallization process, the test results showed that the addition of glycerin to the OxyBloc® at levels less than or equal to 10 weight percent demonstrated a dramatic improvement in oxygen barrier properties of the metallized film. In fact, it appears that the optimum level of addition for the glycerin, for metallizable coatings of OxyBloc® may be well below 10 weight percent of the blend. However, in accordance with the broadest aspects of this invention the upper percentage limit of glycerin is dictated by the creation of an oily surface resulting from the glycerin exuding through the surface of the film.

It should be noted that the water vapor transmission rate (WVTR) values for each of the films, including the control, were poor, and are believed to be the result of the poor metallization described above.

A subsequent study was carried out to determine the effect of coating thickness on the oxygen transmission barrier properties of coatings employing both 100% OxyBloc® and a blend of 90% OxyBloc and 10% glycerin. The results of this testing is shown in Table 5 below.

TABLE 5

| Coating Composition | Coating Weight lbs/ream | % Haze | WVTR (g/100 in²/day) 100° F., 90% RH | O2TR (cc/100 in²/day) 73° F., 0% RH |
| --- | --- | --- | --- | --- |
| 100% OxyBloc ® | 0.9 | 3.0 | 0.27 | 0.79 |
| 100% OxyBloc ® | 2.0 | 3.1 | 0.26 | 0.39 |
| 100% OxyBloc ® | 3.1 | 3.0 | 0.26 | 0.35 |
| 100% OxyBloc ® | 5.9 | 3.1 | 0.24 | 0.13 |
| 90% Oxy/10% glycerin | 1.0 | 3.1 | 0.21 | 0.46 |
| 90% Oxy/10% glycerin | 2.0 | 3.1 | 0.21 | 0.19 |
| 90% Oxy/10% glycerin | 3.2 | 3.1 | 0.24 | 0.15 |
| 90% Oxy/10% glycerin | 6.1 | 3.0 | 0.24 | 0.06 |

It should be noted that the addition of 10 weight percent to the OxyBloc® 670 C 1376 demonstrated a very significant and consistent reduction in oxygen transmission rate over the entire coating weight range employed in the testing. Moreover, the water barrier property was not deteriorated, and in fact, appeared slightly improved with the 10 weight percent addition of glycerin. The film optics remained substantially constant over the coating weight range and were unaffected by the addition of glycerin. In addition, there were no signs of a greasy or sticky surface on the coatings that contained the glycerin. Moreover, the coating adhesion of the glycerin containing films was excellent at 100% with both 3M Scotch #610 and #800 tapes.

The results reported in Table 5 clearly show that the coating weight affects oxygen barrier properties, with the thicker coatings having the better properties. Thus, when comparing the benefits of this invention to the use of polyetheramine resin by itself it is important that the comparison be made with samples employing the same coating weights. It also is important to note that the improvement in oxygen barrier performance is obtained by adding a modifier such as glycerin, which has a substantially lower cost than the OxyBloc® (OxyBloc®=~$9/dry lb and glycerin=~$1/lb). Thus, this invention provides a significant reduction in coating raw material costs and also allows the use of thinner, lower cost layers to achieve the same level of barrier performance as unmodified OxyBloc®.

The samples tested and reported in Table 5 were then bell jar metallized on the coatings.

The results of the testing of the metallized samples are set forth in Table 6 below.

Rod can be explained by the presence of very large pin-holes and low optical density. The oxygen barrier properties for the remaining films were improved from approximately 20% to about 80% with the addition of 10% glycerin to the polyetheramine resin.

Applicants then formulated coating compositions employing 0, 2.5, 5, 10, 15 and 20 weight percent glycerin blended with polyetheramine resin. These formulations were then applied as a coating to a surface of a three layer, coextruded polypropylene film between the machine direction and transverse direction draws at a thickness of approximately 1.5 mils (~1 mil of water and 0.5 mils of solids) prior to a 10x draw in the transverse direction. After the transverse draw the thickness of the coating was approximately 0.05-0.065 mils, or 1-1.3 pounds per ream.

In all cases the wet out with the coatings including glycerin were better than with additive that was devoid of glycerin. Moreover, there was no greasy or oily feel at the 20 weight percent level.

Another series of tests were conducted with the initial coating being applied as a thinner layer such that the thickness of the coating after a 10x draw in the transverse direction was ~0.3-0.5 pounds per ream, as compared to the prior samples wherein the coating after transverse draw was ~1-1.3 pounds per ream. These coating compositions were polyetheramine resin including 0%, 5%, 15% and 25%, by weight glycerin in them. In all cases the coatings wet out much better than the 1 pound per ream coating and there was no oily or greasy feel on any of the coating surfaces.

Applicants then investigated the effectiveness of sorbitol as an additive to increase the oxygen barrier properties of poly-

TABLE 6

| Coating Composition | Coating Weight lbs/ream | Mayer Rod # | WVTR (g/100 in$^2$/day 100° F., 90% RH) | O2TR (cc/100 in$^2$/day 73° F., 0% RH) | Optical Density |
|---|---|---|---|---|---|
| 100% OxyBloc ® | 0.9 | 3 | 0.019 | 0.009 | 3.7 |
| 100% OxyBloc ® | 2.0 | 6 | 0.038 | 0.310 | 1.7 |
| 100% OxyBloc ® | 3.1 | 9 | 0.028 | 0.008 | 1.9 |
| 100% OxyBloc ® | 5.9 | 18 | 0.012 | 0.041 | 3.1 |
| 90% Oxy/10% glycerin | 1.0 | 3 | 0.029 | 0.003 | 2.5 |
| 90% Oxy/10% glycerin | 2.0 | 6 | 0.041 | 0.024 | 3.9 |
| 90% Oxy/10% glycerin | 3.2 | 9 | 0.009 | 0.002 | 4.0 |
| 90% Oxy/10% glycerin | 6.1 | 18 | 0.020 | 0.032 | 2.0 |

Referring to Table 6 it should be noted that the barrier results for both water and oxygen transmission were inconsistent due to the variability of the bell jar metallization process because of limited control over optical density, pinholing and level of vacuum. In spite of these deficiencies in the testing, the results in Table 6 established that the barrier properties with a vapor deposited metal layer (in this case aluminum) appear to be relatively independent of the barrier coating thickness. Moreover, the water vapor transmission rate essentially was unaffected or unchanged by the addition of 10% glycerin to the OxyBloc. However, the oxygen transmission rate was significantly improved by the addition of 10% glycerin in the OxyBloc, as compared to the samples that were devoid of glycerin.

The anomaly of the relatively high oxygen transmission rate reported for the 100% OxyBloc coating with a #6 Mayer Rod can be explained etheramine resin via the hand drawdown method on a flame treated BOPP, 8.5x11 inch substrate. Sorbitol (a 70%, by weight, dispersion in water) contains two hydroxyl end groups and four pendent hydroxyl groups on each of the four mid chain carbon atoms. As is shown in Table 7 below, sorbitol yielded a significant improvement in oxygen barrier properties versus unmodified polyetheramine resin and also was superior to that of glycerol at comparable loading levels. Modification of the polyetheramine resin with sorbitol also yielded good WVTR however the tape adhesion was compromised at higher loadings of 20-30 wt. %. It should be noted that the numbers reported in the "% Adh" column are the percentages of the surface area of the coating on which the adhesive remains after testing. It is believed that coating adhesion at higher additions of sorbitol in excess of 20 wt. % can be achieved by coating onto a maleated polypropylene or similar tie-layer resin.

TABLE 7

| Wt. % sorbitol | Ctg. Wt. lbs/rm | % Haze | WVTR g/100 in²/day | O2TR cc/100 in²/day | % Adh 610/800 |
|---|---|---|---|---|---|
| 5 | 3.2 | 3.1 | 0.20 | 0.14 | 100/100 |
| 10 | 3.3 | 3.2 | 0.18 | 0.09 | 100/100 |
| 20 | 3.3 | 3.7 | 0.19 | 0.03 | 100/40 |
| 30 | 3.2 | 4.9 | 0.18 | 0.03 | 0/0 |
| 100% OxyBloc ®(Control) | 3.0 | 3.1 | 0.17 | 0.27 | 100/100 |
| 10% glycerol | 3.1 | 3.1 | 0.18 | 0.14 | 100/100 |

Applicants encountered a surprising result when glycerin and sorbitol were combined as additives to the polyetheramine resin. Specifically, Applicants made three film samples (via the inter-draw method); one with OxyBloc by itself; one with 20% commercial grade glycerin added to the OxyBloc and one with 15% glycerin and 10% sorbitol, based on the weight of the composition. It should be noted that the commercial grade glycerin is less than 99% pure and has a boiling point of approximately 171° C., which is lower than the boiling point of high purity glycerin-utilized in the previous trials.

All samples had a coating weight of approximately 1-1.3 pounds per ream. These samples were tested for oxygen barrier properties with the results set forth in Table 8 below:

TABLE 8

| Composition | O2TR (cc/100 in²/day): |
|---|---|
| OxyBloc (100%) | 1.0 |
| OxyBloc (20% glycerin) | 0.96 |
| OxyBloc (15% glycerin and 10% sorbitol) | 0.31 |

The combination of glycerin and sorbitol, as tested, gave far superior results than the glycerin alone. This appears to be the result of the commercial grade glycerin vaporizing, or flashing off in the preheat-stretching section of the tenter oven, in which the required temperature for drying and stretching is above the 171° C. boiling point; i.e., in the range of approximately 176-182° C. However, sorbitol has a substantially higher boiling point, on the order of approximately 296° C., and therefore did not flash off during the drying and stretching operation in the tenter oven. Thus, it is reasonable to believe that the product in which both glycerin and sorbitol was added essentially had only sorbitol present in the finished, biaxially oriented product, wherein the product in which only glycerin was added essentially had all of the glycerin vaporized out of the product. This explains the results reported in Table 8. It should be noted that the results obtained with the glycerin/sorbitol combination at 1 pound per ream (i.e., 5 gauge) was essentially the same as existed in a commercial prior art coated BOPP film product, AET UBP, including a crystalline PVdC-acrylate copolymer barrier layer applied at a 10 gauge thickness. In other words, it took twice the thickness of PVdC to obtain the same oxygen barrier properties as the OxyBloc® with the glycerin/sorbitol combination as the additive.

Glycerol, sorbitol (70% sorbitol/30% water) and 1, 3' Propanediol were added to OxyBloc 670 C 1376® in combinations between 10 and 30 wt % of the total solids and coated on to a 120 gauge high water barrier base film with a # 10 Meyer rod. The results for this evaluation are given in Table 9, below. It should be noted that the 1, 3' Propanediol has a hydroxyl-to-carbon ration of 0.67, and is within the category of highly hydroxylated organic compounds usable in this invention.

TABLE 9

| Wt % 1,3-Propanediol | Wt % sorbitol | Wt % Glycerol | Ct. Wt. lbs/rm | % Haze | WVTR g/100 in²/d | O2TR cc/100 in²/d | Adh. % 610/800 | Peak Seal (g/in) 250° F. |
|---|---|---|---|---|---|---|---|---|
| 0 | 0 | 0 | 3.0 | 2.7 | 0.11 | 0.28 | 100/0 | 224 |
| 0 | 0 | 10 | 3.2 | 2.7 | 0.12 | 0.14 | 100/0 | 265 |
| 0 | 0 | 20 | 3.1 | 2.5 | 0.11 | 0.11 | 100/0 | 232 |
| 0 | 10 | 0 | 3.0 | 2.7 | 0.11 | 0.07 | 100/0 | 258 |
| 0 | 20 | 0 | 3.2 | 3.1 | 0.11 | 0.06 | 100/0 | 156 |
| 0 | 5 | 5 | 3.1 | 2.5 | 0.18 | 0.09 | 100/0 | 230 |
| 0 | 10 | 10 | 3.2 | 2.5 | 0.18 | 0.04 | 70/0 | 217 |
| 0 | 15 | 15 | 3.3 | 2.6 | 0.15 | 0.04 | 30/0 | 265 |
| 5 | 0 | 5 | 3.2 | 2.6 | 0.14 | 0.23 | 100/0 | 266 |
| 10 | 0 | 10 | 3.0 | 2.7 | 0.18 | 0.16 | 100/100 | 290 |
| 15 | 0 | 15 | 3.0 | 2.8 | 0.17 | 0.14 | 100/0 | 236 |
| 5 | 5 | 0 | 3.0 | 2.7 | 0.11 | 0.12 | 70/0 | 230 |
| 10 | 10 | 0 | 3.3 | 2.5 | 0.11 | 0.18 | 100/0 | 294 |
| 15 | 15 | 0 | 3.2 | 2.6 | 0.11 | 0.04 | 100/0 | 303 |

The coating weights and % haze were essentially equivalent for each of the coating combinations averaging 3.1 lbs/ream (~15 gauge) and 2.6% haze. The coating adhesion was good with the majority of the coating combinations tested using # 610 Scotch tape but generally poor using the # 800 Scotch tape. The poor adhesion results were most likely due to using a corona treated surface instead of a flame treated surface base film. However, the use of corona treatment is still considered to be within the scope of the broadest aspects of this invention.

The coating combinations were heat sealed (ctg./ctg.) at 250° F. as another means of evaluating coating adhesion. Contrary to the # 800 Scotch tape test, the mode of failure in all cases was cohesive coating failure, which is an indication that the coating adhesion to the substrate is good. The ability of the coating to heat seal is also an indication that the modifiers do not cross-link the amorphous polyetheramine resin.

As noted above, the addition of sorbitol to OxyBloc dramatically improves the oxygen barrier performance of the films, and from the standpoint of achieving desirable oxygen barrier properties, is considered by applicant to be preferred over the addition of glycerol.

However, it was determined that the addition of sorbitol to polyetheramine had the negative effect of making the coating blend sensitive to high humidity; resulting in an undesired increase in haze.

As will be shown below, applicant has determined that the addition of a small amount of boric acid to the mixture of OxyBloc and sorbitol significantly improves the resistance of the coated article to humidity without having a significant adverse effect on oxygen barrier performance. Thus, even under high humidity conditions sorbitol is considered to be a preferred additive relative to glycerol.

Table 10 below shows results that establish the benefit of adding boric acid to a coating mixture of OxyBloc and sorbitol when the coating is exposed to high humidity conditions.

oxygen barrier performance by ~50%, while at the same time improving water vapor barrier property of the coating (~13%).

Applicant then investigated the effect of the quantity of sorbitol on the moisture sensitivity of the OxyBloc/sorbitol blend. As noted earlier, sorbitol is substantially less expensive than OxyBloc. Therefore there is a significant economic advantage in being able to increase the amount of sorbitol in the blend to as high a level as possible, while providing a corresponding reduction of the amount of OxyBloc in the blend As can be seen in Table 10, supra, the optimum level of sorbitol in OxyBloc, based on oxygen barrier, was deter-

TABLE 10

| Design. | Total (gauge) | Ctg. Thickness (lbs/ream) | (Wt %) OxyBloc | (Wt %) sorbitol | (Wt %) boric acid | Haze (%) Initial | Haze (%) Humid Aged° | WVTR (g/100 in²/d, 100° F. 90% RH) | O2TR (cc/100 in²/d) 73° F./0% RH) |
|---|---|---|---|---|---|---|---|---|---|
| 475-2 | 70 | 0.26 | 100 | 0 | 0 | 2.8 | 2.7 | 0.41 | 1.8 |
| 475-3 | 72 | 0.35 | 90 | 10 | 0 | 2.4 | 2.5 | 0.33 | 0.5 |
| 475-4 | 68 | 0.44 | 85 | 15 | 0 | 2.2 | 5.3 | 0.40 | 0.3 |
| 475-5 | 72 | 0.44 | 80 | 20 | 0 | 2.1 | 6.7 | 0.40 | 0.2 |
| 475-7 | 70 | 0.32 | 78 | 20 | 2.0 | 2.8 | 2.7 | 0.33 | 0.5 |

°Stored for ~3 months at ~75° F. and >50% R.H.

As can be seen from the above data, the sensitivity to humid conditions for the OxyBloc/sorbitol blend begins at between 10-15 wt % addition of sorbitol. However, replacing 2% of the OxyBloc with 2% boric acid in an 80/20 wt % OxyBloc/sorbitol blend dramatically improved the humidity resistance, equal to the OxyBloc coating without the addition of sorbitol, while maintaining a significant improvement in oxygen barrier performance of the composition.

Applicant then investigated the effect of increasing levels of boric acid in a ~80% OxyBloc/20% sorbitol coating blend. These coatings were applied with a # 10 Meyer rod on to a 115 gauge biaxially oriented polypropylene base film and oven dried. The coating thickness was ~13.0 gauge.

The results of this investigation are reported in Table 11, below.

mined at the time of this testing to be ~20 wt %. At that level the coating blend became susceptible to hazing with exposure to humidity (See Table 10). However, as can be seen in Tables 10 and 11, supra, it has been found that the addition of 0.5 to <3.0 wt % boric acid to this blend ratio significantly reduces moisture sensitivity. As noted above, since sorbitol is much less expensive than OxyBloc it is desirable to incorporate as much sorbitol as possible into the blend to reduce the overall cost of the coating.

As a result of later testing, to be discussed hereinafter, it appears that the percent by weight of sorbitol usable in the compositions of this invention can be as high as 40%, or greater.

Based on the advantage of increasing the amount of sorbitol in the blend applicants investigated coating blends of

TABLE 11

| Design. | Total (gauge) | Ctg. Thickness (lbs/ream) | (Wt %) OxyBloc | (Wt %) sorbitol | (Wt %) boric acid | Haze (%) | WVTR (g/100 in²/d, 100° F. 90% RH) | O2TR (cc/100 in²/d) 73° F./0% RH) |
|---|---|---|---|---|---|---|---|---|
| 001 | 128 | 2.66 | 80.0 | 20.0 | 0.0 | 8.6 | 0.31 | 0.051 |
| 002 | 128 | 2.61 | 79.5 | 20.0 | 0.5 | 5.2 | 0.30 | 0.074 |
| 003 | 129 | 2.70 | 79.0 | 20.0 | 1.0 | 3.8 | 0.28 | 0.039 |
| 004 | 128 | 2.61 | 78.0 | 20.0 | 2.0 | a 4.1 | 0.27 | 0.026 |
| 005 | n/a | n/a | 77.0 | 20.0 | 3.0 | [Coating gelled: too thick to draw down] | | |

As noted above, the addition of boric acid at 3.0 wt % caused the coating blend to thicken (gel) to the point that it could not be applied to the base film. Based on the above-reported results it appears that the upper limit of boric acid addition is somewhere below 3%. The addition of just 0.5 wt % boric acid to the OxyBloc/sorbitol mixture significantly improved (lowered) the haze value. Boric acid levels of 1.0 and 2.0 wt % showed further improvement in optics and OxyBloc and 1.0 wt % boric acid with sorbitol ranging from 20 to 40 wt %. Since sorbitol is not a film forming ingredient it is believed that levels significantly greater than 40 wt % would be sticky and therefore not useful in this invention. These coatings were applied to the same 115 gauge biaxially oriented polypropylene base film as in earlier described tests, using a # 9 Meyer rod and oven dried. The results of this investigation are reported in Table 12.

TABLE 12

| Design. | Total (gauge) | Ctg. Thickness (lbs/ream) | (Wt %) OxyBloc | (Wt %) sorbitol | (Wt %) boric acid | Haze (%) | WVTR (g/100 in$^2$/d, 100° F. 90% RH) | O2TR (cc/100 in$^2$/d) 73° F./0% RH) |
|---|---|---|---|---|---|---|---|---|
| 001 | 130 | 15 | 80.0 | 20.0 | 0.0 | 7.9 | 0.27 | 0.041 |
| 002 | 128 | 13 | 79.0 | 20.0 | 1.0 | 4.4 | 0.27 | 0.056 |
| 003 | 131 | 16 | 74.0 | 25.0 | 1.0 | 19.8 | 0.27 | 0.116 |
| 004 | 127 | 12 | 69.0 | 30.0 | 1.0 | 5.0 | 0.28 | 0.264 |
| 005 | 131 | 16 | 64.0 | 35.0 | 1.0 | 27.0 | 0.28 | 1.05 |
| 006 | 127 | 12 | 59.0 | 40.0 | 1.0 | 20.0 | 0.30 | 0.160 |

As can be seen from the results reported in the above Table, significant variability in the optical and oxygen barrier properties were observed when the ratio of sorbitol to boric acid was increased and the amount of OxyBloc was decreased below 79.0 wt %.

It should be noted that the laboratory draw down method used in forming the films employed in the testing reported in Table 12 exposed the coating to a significantly lower level of heat as compared to the drying/orientation process when the coatings are applied in-line in a pilot or commercial production line. It is theorized that the higher heat exposure in the in-line coating process aides the immediate "chelating" effect of the boric acid with the sorbitol.

The same films employed in the tests reported in Table 12 were then exposed to humidity for 24 hours at 80° F./80% RH and re-tested for percent haze. These films were then exposed to heat aging for 2 days at 70° C. and then again to humidity for 24 hours. The optical results of this cyclic exposure to humidity and heat are reported in Table 13.

TABLE 13

| Design. | Initial | 24 hours/ 80° F./80% RH Humid Aged | 48 Hrs./70° C. Heat Aged | 24 hours/ 80° F./80% RH Humid Aged |
|---|---|---|---|---|
| 001 | 7.9 | 6.6 | 6.9 | 8.2 |
| 002 | 4.4 | 4.6 | 4.2 | 4.4 |
| 003 | 19.8 | 11.9 | 3.5 | 3.7 |
| 004 | 5.0 | 3.7 | 14.8 | 5.0 |
| 005 | 27.0 | 11.8 | 25.6 | 4.8 |
| 006 | 20.0 | 4.9 | 24.6 | 3.3 |

As can be seen in the above Table, except for sample 002, the first exposure to humidity surprisingly yielded an improvement (reduction) in % haze, which, in some cases was substantial. Applicants believe that the reason this same improvement was not observed for sample 002 is because the initial haze was low in the first place. However, the second exposure to heat (the first was the original oven drying) resulted in a surprising increase in % haze for the coatings with a sorbitol/boric acid ratio of 30/1 or higher (i.e., samples 004-006) relative to the % haze after the first exposure to humidity. The coating with a sorbitol/boric acid ratio of 20/1 remained optically stable relative to the control and relative to the sample after the first exposure to humidity. A second exposure to the humidity, once again, yielded a significant reduction in % haze of the sorbitol/boric acid ratios of 30/1 or higher (i.e., samples 004,005 and 006) relative to the films after the second exposure to heat, while the 20/1 and 25/1 sorbitol/boric acid ratio coatings (i.e., samples 002 and 003) remained relatively unchanged as did the control (i.e., sample 001

Clearly the test results reported in Table 13 are erratic and suggest the effects of heat and humidity on laboratory applied coatings with increasing levels of sorbitol are not well defined. The only truly stable coating appeared to be the blend of 79% OxyBloc/20% sorbitol/1.0% boric acid.

In an effort to determine whether even higher percentages of sorbitol could be employed in the mixture, applicant investigated the feasibility of blends including 60/40% OxyBloc/sorbitol with boric acid levels ranging from 1-3 wt % (the percent boric acid replacing the OxyBloc to maintain the weight percent of sorbitol at 40%) in an attempt to lock-up (or chelate) the coating to prevent moisture sensitivity. These coatings were applied to the same 115 gauge biaxially oriented base film as employed in the earlier testing, with a #8 Meyer rod. Coatings 001 to 003 were tested after aging under ambient conditions. Coatings 005 to 007 were tested after humidity aging for 24 hours at 80° F./80% RH. The results of this study are reported in Table 14.

TABLE 14

| Design. | (Wt %) OxyBloc | (Wt %) sorbitol | (Wt %) boric acid | Haze (%) | WVTR (g/100 in$^2$/d, 100° F. 90% RH) | O2TR (cc/100 in$^2$/d 73° F./0% RH) |
|---|---|---|---|---|---|---|
| 001 | 60.0 | 40.0 | 0.0 | 20.0 | 0.29 | 2.7 |
| 002 | 59.0 | 40.0 | 1.0 | 18.4 | 0.29 | 0.042 |
| 003 | 58.0 | 40.0 | 2.0 | 10.6 | 0.27 | 0.012 |
| 004 | 57.0 | 40.0 | 3.0 | [coating too thick to coat/gelled] | | |
| 005 | 60.0 | 40.0 | 0.0 | 39.8 | 0.25 | 1.04 |
| 006 | 59.0 | 40.0 | 1.0 | 3.4 | 0.27 | 2.03 |
| 007 | 58.0 | 40.0 | 2.0 | 3.0 | 0.25 | 0.0087 |
| 008 | 57.0 | 40.0 | 3.0 | [coating too thick to coat/gelled] | | |

Each ambient-aged coating showed very high haze. However, the addition of 2.0 wt % did reduce haze by ~50% vs. the control without boric acid. The WVTR was reduced slightly with 2.0 wt % boric acid, however the oxygen barrier was significantly improved with both 1 and 2.0 wt % boric acid addition.

The % haze of the control coating exposed to humidity increased significantly relative to the control that was maintained at ambient conditions. However, both the water vapor and oxygen barrier properties improved. The % haze of the coatings with 1.0 and 2.0 wt % boric acid improved dramatically with exposure to humidity relative to the control with no boric acid. The 2.0 wt % boric acid coating (20/1 sorbitol/boric acid) demonstrated the highest level of oxygen barrier. The results reported in Table 14 support applicants' belief that compositions including 40% by weight sorbitol, and possibly even higher can be blended with polyetheramine and boric acid to achieve excellent oxygen barrier properties and clarity.

In accordance with broadest aspects of this invention, the coatings or resinous layers, applied by any of the known methods, can be employed on a variety of articles wherein improved gas (e.g., oxygen) barrier properties are desired. In a preferred embodiment of this invention the coating is applied to a multilayer, coextruded plastic film. The specific film composition employing the coatings of this invention does not constitute a limitation on the broadest aspects of the invention. That is, the films including the coatings of this invention can be of a variety of different polymer structures. However, in the preferred constructions the films are bi-axially oriented, multi-layer structures; preferably formed from polypropylene.

"Polypropylene" as used in this application includes polypropylene homopolymers and propylene heteropolymers. The term "propylene heteropolymers" includes polymers of propylene with at least one other alpha-olefin, preferably C2C3 copolymers with less than 10% by weight, $C_2$ or $C_3C_4$ copolymers with less than 30% $C_4$. The term "polypropylene homopolymer" is intended to include not only pure homopolymers but also copolymers of propylene wherein the amount of ethylene does not adversely affect the crystallinity, i.e., copolymers wherein the percent ethylene by weight is less than 2% and more preferably less than 1%. These latter copolymers are often referred to as mini-random copolymers of propylene.

A representative, but not limiting exemplary film of this invention includes an interior core layer having a thickness in excess of 30 gauge and most preferably in the range of 30 to 150 gauge. This core layer can be made of a variety of different compositions; and most preferably is formed of an isotactic homopolymer of polypropylene or a blend of at least 70 weight percent high crystallinity polypropylene homopolymer (HCPP) and no more than 30% by weight of a low molecular weight hydrocarbon resin (generally referred to as "hard resin"). Alternatively, the core can include a blend of isotactic homopolymer polypropylene, a high melt strength (HMS) polypropylene and a whitening agent, such as titanium dioxide ($TiO_2$). High melt strength polypropylenes are well known to those skilled in the art; a representative formulation being disclosed in Masuda, et al., Published Application U.S. 2004/0053064 the subject matter of which is hereby incorporated by reference.

Alternatively, the core can include a cavitated homopolymer polypropylene, wherein the cavitating agents can be selected from any of the well-known inorganic/organic void initiating agents, as well as beta-nucleated polypropylene. It should be understood that voiding agent(s) are employed in the core form opaque films in accordance with the present invention.

Although the above discussion includes several different formulations usable in the core layer, these formulations are not considered to be limitations on the broadest aspects of this invention.

An adhesion promoting tie layer is coextruded with the core layer at a thickness of preferably from about 1 to 10 gauge. Representative tie layers are maleic-anhydride grafted polypropylene or maleic-anhydride grafted ethylene-propylene copolymers.

A polyolefin bonding layer or heat sealable layer is coextruded with the core layer on the side of the core layer opposed to the tie layer. Most preferably, this bonding layer or heat sealable layer has a thickness of 1 to 10 gauge; such bonding and heat sealable layers being well known to those skilled in the art.

The coextruded structure described above can be formed in a conventional tenter process, and most preferably is bi-axially oriented in both the machine direction and cross-machine direction. The oxygen barrier coatings of this invention, e.g., a blend of polyetheramine resin and glycerin and/or sorbitol, are applied directly to the tie layer, either after complete formation of the bi-axially oriented coextruded structure or between the machine direction and cross-machine direction stretching operations in the tenter equipment. The use of such a tie layer may not be necessary if the base film is corona treated in an atmosphere of N2 and or N2:CO2, as is known in the art. In this latter case the bonding layer could be any standard polyolefin i.e. homopolymer PP.

It should be noted that when glycerin is applied in an inter-draw process between the machine direction and cross-machine direction stretching operations there is potential problem of it vaporizing, or flashing out of the product when a commercial grade glycerin is utilized having a lower boiling point than the temperature required to be maintained in the tenter oven.

In structures wherein the oxygen barrier layer is not required to include an additional coating or layer, such as a metallized layer, there generally is no need for any treatment of the exposed surface of the oxygen barrier material. On the other hand, if the film is to be metallized by a conventional metallizing operation employing either metals or metal oxides, then the oxygen barrier coating preferably is oxidatively treated, e.g., corona, flame, plasma, etc.

When the coextruded polyolefin layer on the opposed side of the core layer is a bonding layer, and therefore intended to receive an adhesive thereon, the layer generally will be oxidatively treated, such as by flame, corona or plasma treatment. When the coextruded polyolefin layer is a heat sealable layer no oxidative treatment generally is required.

It should be noted that the polypropylene employed in this invention may be, for example, a polypropylene homopolymer, a copolymer of propylene, or a blend of homopolymers and copolymers. Moreover, the coextruded film may also include reclaimed material.

The coextruded structure, i.e., the base film, can include a variety of additives that are well known to those skilled in the art. For example, the film can include anti-block agents, slip agents, pigments, etc.

An anti-block agent may be a silica-based agent, a silicone-based agent, or a blend of a silica-based agent and a silicone-based agent. The anti-block agent generally can be present in a variety of weight percents and preferably, if included in the film, is present in an amount up to 1% by weight of the film, and more preferably, up to 0.5% by weight of the film.

It should be understood that the coating compositions of this invention can be employed on a variety of articles in which improved gas (e.g., oxygen) barrier properties are desired or required. Moreover, these compositions can be employed by themselves or in combination with a metallized layer (or other post treatments such as metal oxides etc), depending upon the requirements of the product being made.

Although illustrated and described herein with reference to certain specific embodiments, the present invention is nevertheless not intended to be limited to the details shown. Rather, various modifications may be made in the details within the scope and range of equivalence of the claims and without departing from the spirit of the invention.

What is claimed is:

1. A high gas barrier composition usable as a coating or layer on an article, said composition including a blend of polyetheramine resin and at least one additive being a highly hydroxylated organic compound and being present in a weight percentage of said composition for increasing the gas barrier properties of the polyetheramine resin.

2. The composition of claim 1 being a high oxygen barrier composition.

3. The composition of claim 1, wherein said at least one additive is present in a weight percentage for increasing the gas barrier properties of the polyetheramine resin by at least 20 percent in comparison to the gas barrier properties of approximately the same weight of polyetheramine resin but without the additive.

4. The composition of claim 1, wherein said at least one additive is a low molecular weight, highly hydroxylated organic compound.

5. The composition of claim 1, including at least 0.5% of said at least one additive.

6. The composition of claim 1, including more than 70% by weight of a polyetheramine resin and from about 0.5% to less than 30% of said at least one additive.

7. The composition of claim 1, including 85-99.5 percent, by weight, polyetheramine resin and at least 0.5-15 percent, by weight, of said at least one additive.

8. The composition of claim 1, including no more than 10 percent, by weight, of said additive.

9. The composition of claim 1, further including from about 0.5% to less than 3% boric acid therein.

10. The composition of claim 1, wherein said additives include both sorbitol and glycerin.

11. The composition of claim 1, including two highly hydroxylated organic compound additives.

12. The composition of claim 11, wherein one of said two additives is glycerin and the other of said two additives sorbitol.

13. The composition of claim 12, wherein said glycerin and sorbitol are present in a combined weight percent of about 25.

14. The composition of claim 1, wherein said at least one additive is glycerin.

15. The composition of claim 14, including less than 30% of said at least one additive.

16. The composition of claim 14, wherein the glycerin is present in a weight percent of the composition in the range of 0.5% to less than 30%.

17. The composition of claim 16, including 85-99.5 percent, by weight, polyetheramine resin and 0.5-15 percent, by weight, glycerin.

18. The composition of claim 16, including no more than 10 percent, by weight, glycerin.

19. The composition of claim 1, wherein said at least one additive is sorbitol.

20. The composition of claim 19, further including from about 0.5% to less than 3% boric acid therein.

21. The composition of claim 19, wherein the sorbitol is present in a weight percent of the composition in the range of 0.5% to at least 40%.

22. The composition of claim 21, including at least 5% sorbitol.

23. The composition of claim 21, further including from about 0.5% to less than 3% boric acid therein.

24. An article including a high gas barrier layer comprising a blend of polyetheramine resin and an at least one additive being a highly hydroxylated organic compound for increasing the gas barrier properties of the polyetheramine resin.

25. The article of claim 24, wherein said gas barrier layer is an oxygen barrier layer.

26. The article of claim 25 wherein said at least one additive increasing the oxygen barrier properties of the polyetheramine resin by at least 20%.

27. The article of claim 24 wherein said at least one additive being a low molecular weight, highly hydroxylated organic compound.

28. The article of claim 24 wherein said at least one additive includes glycerin.

29. The article of claim 28 wherein the glycerin is present in a weight percent of the composition in the range of 0.5% to less than 30%.

30. The article of claim 24, wherein said at least one additive includes sorbitol.

31. The article of claim 30, wherein the sorbitol is present in a weight percent of the composition in the range of 0.5% to at least 40%.

32. The article of claim 24, further including boric acid in a weight percent of about 0.5 to less than 3 based on the weight of the barrier layer in the article.

33. The article of claim 24, wherein said at least one additive includes both sorbitol and glycerin.

34. The article of claim 24 in the form of a packaging film.

35. The article of claim 24, including a metallized layer on said barrier layer.

36. The article of claim 24, including a multilayer, coextruded structure, said coextruded structure including a polypropylene core layer.

37. The article of claim 36, wherein said coextruded structure is biaxially oriented.

38. The article of 36, wherein said coextruded structure further includes a polyolefin layer on a side of the core layer opposed to the high gas barrier layer.

39. The article of claim 24, wherein said high gas barrier layer is applied as a coating to the multilayer, coextruded structure.

40. The article of claim 24, wherein said high gas barrier layer is applied to a tie layer of the article.

41. The article of claim 40, wherein the tie layer is a maleic-anhydride grafted polypropylene.

* * * * *